United States Patent
Sanson

(10) Patent No.: US 8,217,641 B2
(45) Date of Patent: Jul. 10, 2012

(54) DEVICE AND METHOD FOR READING ELECTRIC CURRENTS RESULTING FROM AN ELECTROMAGNETIC SIGNAL DETECTOR

(75) Inventor: Eric Sanson, Grenoble (FR)

(73) Assignee: Societe Francaise De Detecteurs Infrarouges-Sofradir, Chatenay Malabry (FR)

( * ) Notice: Subject to any disclaimer, the term of this patent is extended or adjusted under 35 U.S.C. 154(b) by 250 days.

(21) Appl. No.: 12/568,096

(22) Filed: Sep. 28, 2009

(65) Prior Publication Data

US 2010/0090681 A1    Apr. 15, 2010

(30) Foreign Application Priority Data

Oct. 15, 2008 (FR) .................... 08 56990

(51) Int. Cl.
*G01R 1/00* (2006.01)
(52) U.S. Cl. ............. 324/111; 348/308; 365/189.15; 365/185.24; 327/514; 327/515
(58) Field of Classification Search ............ 324/111
See application file for complete search history.

(56) References Cited

U.S. PATENT DOCUMENTS

| | | | | |
|---|---|---|---|---|
| 5,335,015 A | * | 8/1994 | Cooper et al. | 348/302 |
| 5,471,515 A | * | 11/1995 | Fossum et al. | 377/60 |
| 5,742,047 A | * | 4/1998 | Buhler et al. | 250/214 R |
| 5,898,168 A | * | 4/1999 | Gowda et al. | 250/208.1 |
| 6,297,492 B1 | | 10/2001 | Clark | |
| 6,317,154 B2 | * | 11/2001 | Beiley | 348/308 |
| 6,518,558 B1 | * | 2/2003 | Bohm et al. | 250/208.1 |
| 6,710,804 B1 | * | 3/2004 | Guidash | 348/302 |
| 6,982,403 B2 | * | 1/2006 | Yang et al. | 250/208.1 |
| 2004/0155247 A1 | | 8/2004 | Benthien | |

FOREIGN PATENT DOCUMENTS

| | | |
|---|---|---|
| FR | 2 896 929 A1 | 8/2007 |
| FR | 2 915 833 A1 | 11/2008 |
| WO | 99/60777 A1 | 11/1999 |
| WO | 02/51130 A1 | 6/2002 |

\* cited by examiner

*Primary Examiner* — Richard Isla Rodas
(74) *Attorney, Agent, or Firm* — Burr & Brown

(57) ABSTRACT

A device for reading electric currents including a capacitive element to integrate the current, the terminals of the capacitive element being connected to the mass and to an output branch of the device respectively, and a differential pair including: a first transistor mounted between the input branch of the input stage and the capacitive element, the transistor being controlled by a polarized impulse voltage, capable of putting the first transistor alternately into the off state and then into the on state; and a second transistor mounted between the input branch of the input stage and a potential other than that of the capacitive element, said transistor also being controlled by a polarized impulse voltage, capable of putting the second transistor alternately into the off state and then into the on state, wherein the second transistor is mounted in phase opposition relative to the first transistor.

6 Claims, 2 Drawing Sheets ative element 102.

DEVICE AND METHOD FOR READING ELECTRIC CURRENTS RESULTING FROM AN ELECTROMAGNETIC SIGNAL DETECTOR

FIELD OF THE INVENTION

The present invention relates to the field of the design of integrated circuits for reading the current coming from a sensor during an integration time in order to store the relevant charges in a capacitor.

The present invention relates more particularly to a device for reading electric currents, such as those generated in the elementary sensors of a matrix photo-detector during the interactions between photons and matter. In particular, the device constituting the object of the present invention may be used to convert the analog quantities produced by infrared detectors, and more particularly cooled bolometric detectors, into digital values.

The present invention also relates to a method for reading electric currents employed by the device constituting the object of the invention.

BACKGROUND OF THE INVENTION

Generally speaking, to read the electric current coming from a sensor, a two-phase method needs to be adopted, namely:

an integration phase, during which the moving charges coming from the sensor are directed towards a capacitive element so that they can be accumulated therein, and a read phase as such, during which the capacitive element is discharged so that the previously accumulated moving charges can be directed to an output stage, in which said current, resulting from the moving charges, is processed.

In the particular case of a photosensitive sensor, the moving charges are liberated during the interactions between photons and matter which occur in a photosensitive element making up the elementary sensor or sensors that constitute the electromagnetic radiation detector. Electrical devices for reading such currents therefore act as the integration interface between the sensors of the detector and the output stages, which constitute the circuit for exploiting the integrated signals.

From the prior art, different architectures are known for designing a read device of this kind. Read device is taken to mean, in the context of the present invention, the input stage of the circuit for reading and exploiting the signals delivered by the detector.

Indeed, in a known way, a read and exploitation circuit comprises an input stage directly connected to the detector, and an output stage receiving the signals integrated by said input stage.

Among prior art read devices, the device is known which is shown in FIG. 1 and generally known as a direct injection input stage. A read device or input stage of this kind comprises a polarization transistor 101 and an integrating capacitive element 102.

As shown in FIG. 1, the source of the transistor 101 is connected to the input branch intended to inject into this input stage a current $I_e$ for reading, coming for example from a photodiode, subjected to an incident radiation flux. The drain of the transistor 101 is itself connected to a terminal of the capacitive element 102, and to a terminal connected to the output stage. These three terminals are therefore brought to the output potential $V_s$. The other terminal of the capacitive element 102 is connected to a reference potential $V_-$, generally the potential of the mass. Moreover, the gate of the transistor 101 is connected to a polarization voltage source, which determines the level of polarization of the detector across the transistor 101.

In operation, the moving charges liberated during the interactions between photons and matter occurring in the sensor located upstream of the input branch generate the current for integration $I_e$ and they accumulate on the capacitive element 102. This charge build-up therefore equates to the so-called "integration" phase.

At the end of the integration phase, the integrating capacitive element 102 may be read and discharged. The resulting signal is then directed to the output stage and the exploitation circuit. This is the current "read" phase itself.

Architecture of this kind is commonly known as a direct injection input stage. Depending on the way it is implemented, said architecture may be broken down into different versions.

FIG. 2 shows for example the addition of a selection transistor 203 on the output branch of the input stage shown in FIG. 1. The selection transistor 203 allows a plurality of input stages to be put in parallel for a single output stage. The transistor 203 thus performs a selection function and can be used to multiplex a plurality of parallel input stages.

As a rule, designers seek to miniaturize photo-detector components as much as possible in order to increase the resolution, and therefore the number of pixels formed on the image surface. This constraint on bulk concerns not only the elementary sensors themselves, but also the electronic circuits that provide the interface between the detector and its exploitation circuit, namely the input stages and the output stages.

Apart from this constraint on bulk which is crucial, photo-detectors must generally consume as little power as possible and have very short reaction and integration times. The power consumption problem proves particularly significant in the case of cooled photo-detectors, such as diode detectors for the infrared radiation spectrum for example.

It is for this reason that integrated circuits constituting current read devices are generally deemed to have of necessity to comprise few electronic components and offer a relatively straightforward architecture. This then means that the space they require and the power they consume, and therefore the Joule heating thereof, can be reduced.

Prior art integrated circuits, such as those shown in FIGS. 1 and 2, respect these bulk and overheating constraints, but need to be completed to provide reset and integration blocking functionalities.

To provide reset, the proposal has been made to produce a direct injection input stage, offering the integrated circuit architecture shown in FIG. 3. To the core architecture of the circuit in FIG. 1 is added a transistor 305 the function of which is to reset the integrating capacitance 302 prior to each integration phase. Furthermore, in the context of the input stage shown in FIG. 2, the integrating capacitance 202 may be reset when the input stage is selected using the selection transistor 203.

The input stages shown in FIGS. 1 and 2 have furthermore the drawback of being sensitive to bloom, which even so causes the sensor to depolarize or a parasitic current to appear in the multiplexing system. Blooming is produced when the "hot" source detected by the sensor is too intense, and saturates said sensor.

It is necessary as a result to add an anti-blooming transistor 304 to integrated circuits of this kind, thereby increasing the number of electronic components, and therefore the bulk of the read device.

To block integration, in the case of the input stages shown in FIGS. 1, 2 and 3, a known solution is the sampling of the wanted signal in the pixel. To do this, a transistor 406 and a storing capacitive element 407 are added in a known way in order to sample the voltage at the terminals of the integrating capacitance 402. The capacitive element 407 stores the signal in the pixel and authorizes the start of the next integration during the sequential read. It is thus possible to integrate the charges during the sequential read, which gives a time gain for the integration phase.

However, adding components of this kind, and in particular the capacitive element 407, necessarily increases the bulk of the read device, as well as its power consumption.

To partially overcome these drawbacks, a capacitive element 407 of small dimensions, and therefore of small capacity, is generally implanted, as well as a transistor 406 of size reduced to the minimum.

However, sizing the components 406 and 407 in this way causes a degradation of the wanted signal, in other words of the integrated current, since there is dilution of the wanted signal, increase in noise and injection of non-linear charges in the transistor 406.

The value of the dilution of the wanted signal is $$1 - \frac{C_{402}}{C_{402} + C_{407}},$$

where $C_{402}$ and $C_{407}$ are the values of the capacitances of the capacitive elements 402 and 407 respectively.

The quadratic noise contribution is furthermore equal to $$\frac{kT}{C_{407}},$$

where T is the temperature and k the Boltzmann constant.

Such a degradation of the wanted signal inevitably involves a decrease in the signal-to-noise ratio, and therefore in the performance of the photo-detector provided with an input stage of this kind.

The injection of non-linear charges itself degrades the linearity of the wanted signal when the wanted charge stored in the capacitive element 407 is small.

Another known solution for blocking integration comprises blocking the polarization transistor in order to define a windowing.

FIG. 5 thus shows a direct injection input stage, with the windowing function thereof being provided by means of a polarization transistor 501, the control or gate voltage of which is of the impulse type. In this way, depending on the form of the current pulse of the polarization voltage, the current for reading coming from the detector is switched to the integrating capacitive element 502. However, switching the current for reading in this way has two drawbacks.

First of all, there is instability in sensor polarization, under the effect of the polarization voltage pulses.

Indeed, the input stage must maintain a potential that is as stable or constant as possible at the sensor terminals, in order to effectively inject the currents for reading into the read device constituting the input stage.

But the input stage as shown in FIG. 5 does not allow a stable potential to be maintained at the terminals of the elementary sensor, when the polarization transistor is in the off state, in other words outside the integration phase.

Consequently, prior art input stages that use polarization transistor blocking cannot prevent the integration of parasitic charges into the capacitance, parasitic charges inevitably carried by the diode constituting the elementary sensor. An elementary sensor generally behaves like a diode that has shunt capacitance, like any semi-conductor.

Parasitic charges can be of miscellaneous origin, among which are dark current, or more generally parasitic photons as received by elementary sensors, etc. Quite obviously, such parasitic charges cause a drift in potential difference at the terminals of the elementary sensor and, consequently, degrade the linearity which constitutes an essential performance element in rating any photo-detector.

In addition, in the case of the circuit in FIG. 5, the transistor 501 doing the switching, generally of MOS technology, injects parasitic charges in variable quantity towards the integrating capacitive element 502. Consequently, as is the case in respect of sampling, this architecture has the drawback of degrading the linearity of the wanted signal.

These two drawbacks are particularly disadvantageous if the circuit is to be used defining a plurality of integration windows between two resets of the integrating capacitance.

The aim of the present invention is therefore to propose a current reading device that makes it possible to avoid the drawbacks afforded by the integrated circuits of prior art input stages, among which may be cited variations in sensor polarization, if not the depolarization thereof, the injection of parasitic charges into the integration circuit, a significant bulk, relatively high power consumption, and therefore relatively high Joule heating, the loss of time needed to reset the integrating capacitance, the risk of blooming or, conversely, the additional cost of implanting additional electronic components to deal with these different problems.

SUMMARY OF THE INVENTION

The object of the present invention is therefore a device for reading electric currents, and particularly those coming from elementary matrix sensors, that has a relatively stable potential difference at the terminals of the elementary sensors, restricts the injection of parasitic charges into the integration circuit, is relatively small in bulk, does not consume much energy, is not prone to overheating, is fairly insensitive to blooming, and has good linearity and a high signal-to-noise ratio.

The invention thus relates to a device for reading electric currents received on an input branch, and particularly those coming from elementary sensors of a matrix device for detecting electromagnetic radiation. The read device constituting the object of the invention comprises a capacitive element intended to integrate the current for reading. According to the invention, said read device, or input stage further comprises a differential pair consisting of:
  a first transistor, mounted between the input branch and the integrating capacitance (or capacitive element), said transistor being controlled by a polarized impulse voltage, capable of putting said first transistor alternately into the off state and then into the on state, on state wherein said first transistor is intended to set the potential of the input branch and to supply the capacitive element with the currents for reading;
  a second transistor, mounted between the input branch and a potential other than that of the capacitive element, said transistor also being controlled by a polarized impulse voltage, capable of putting said second transistor alternately into the off state and then into the on state, on state wherein said second transistor is intended to keep the input branch at a constant potential in time other than that of the capacitive element and to drain the charges received on the input branch elsewhere than in the capacitive element, and said second transistor being controlled in phase opposition relative to the first transistor.

In other words, the input stage constituting the object of the present invention comprises a differential pair of transistors, controlled alternately in order to inject a current into the integrating capacitive element during the so-called integration phase, while keeping the polarization voltage of the sensor under consideration constant, and therefore stable, during the read phase, also known as the storage phase, in other words the phase during which said first transistor is in the off mode. Owing to the phase opposition of the voltages controlling the two transistors, when the input stage is in the storage phase, said second transistor is in the on mode, in fact keeping the voltage constant at the terminals of the sensor under consideration.

The integrated circuit so defined therefore has a number of components limited to two transistors, apart from the integrating capacitive element.

It will be noted that in their on state, the first and second transistors keep the polarization voltage constant. This therefore means that the transistors do not behave like closed switches since in such a state, a transistor behaves like a straightforward impedance (and therefore like a passive component), and cannot therefore set a potential. To be able to set a potential, the transistors are therefore controlled in their so-called "saturated mode" on state, as opposed to the so-called "conduction" on state in which a transistor behaves like a closed switch.

In practice, the transistors can be produced using CMOS technology, bipolar or the like. They may be n-type or p-type transistors.

Such transistors allow the current reading device to perform well, particularly in terms of response time linearity or power consumption.

According to another embodiment of the invention, the input branch may be connected to an elementary sensor forming part of an assembly of elementary sensors arranged in a line or in a matrix.

Said feature allows the linearity of the input stage of a matrix photo-detector to be increased. In addition, this structure can be used to achieve multi-integration, in other words a time slicing of the integration windows between two reading resets.

Furthermore, the invention also relates to a method for reading electric currents, and particularly those coming from elementary sensors of a matrix device for detecting electromagnetic radiation. Said method employs a device as previously mentioned and it comprises the following step sequence:
  generating a first voltage pulse, preferably in the form of a square pulse, using the polarized impulse voltage;
  putting the first transistor into the on state in order to supply the capacitive element with the current for reading, while the second transistor is put into the off state;
  generating a second voltage pulse in phase opposition with the first voltage pulse, preferably in the form of a square pulse, using the polarized impulse voltage;
  putting the second transistor into the on state in order to keep the input branch at a constant potential, while the first transistor is put into the off state, the capacitive element then being read across the output branch of the device in order to collect the charges accumulated on the capacitive element.

Such a method can therefore be used to integrate the currents for reading while keeping the sensor polarization constant.

According to one practical embodiment of the invention, the method can comprise repeating the sequence of steps in order to fulfill a plurality of current integration phases in the capacitive element, the phases during which the first transistor is put into the off state and the second transistor is put into the on state allowing the evacuation of the charges received on the input branch by the second transistor in order to read the total amount of integrated charges and intermediate charge build-ups.

Such a method, known as multi-integration, can be used to read a high analog quantity between two intermediate build-up values, and a low analog quantity. The operation and advantages of such a method are described in the Applicant's patent application filed as number FR-2006/50345.

Said method can also be used to integrate multiple small windows for specific purposes.

According to one embodiment of the invention, the amplitudes of the first and second pulses are selected in such a way that a transistor put into the off state is on the verge of triggering the on state. In this way, the second transistor unblocks without greatly depolarizing the detector if the first transistor is no longer able to drain the charges coming from the elementary sensors. An effective anti-blooming function is thus implemented.

BRIEF DESCRIPTION OF THE DRAWINGS

The invention will become clearer from the description of the following particular embodiments, which refer to the figures. The object of the invention is not however restricted to these particular embodiments and other inventive embodiments are possible.

DETAILED DESCRIPTION OF THE INVENTION

Figure 1:
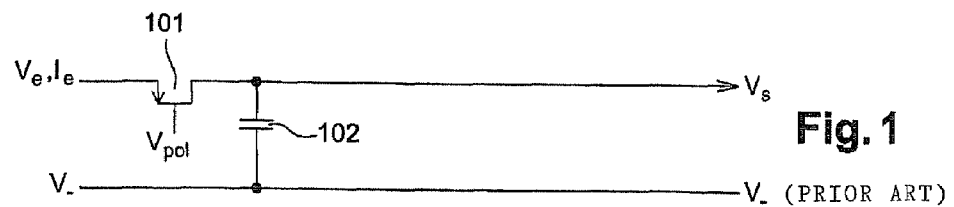
FIGS. 1, 2, 3, 4 and 5 are diagrammatic representations of prior art input stages, as described above.
Figure 2:
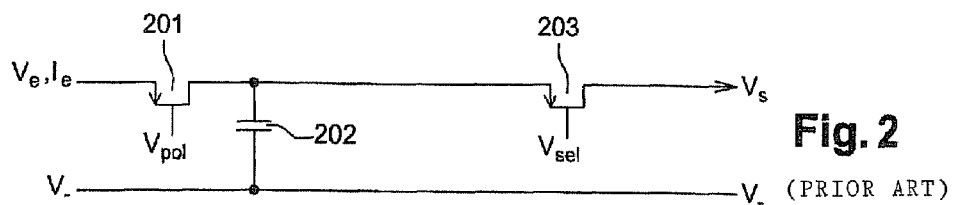
Figure 3:
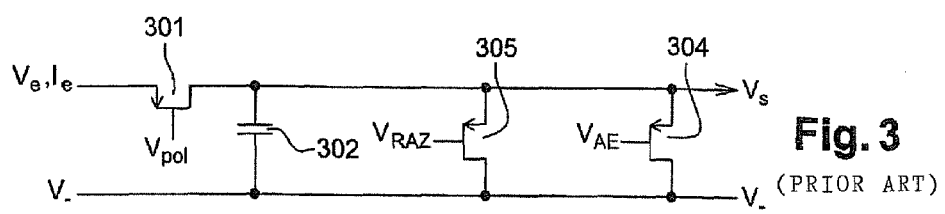
Figure 4:
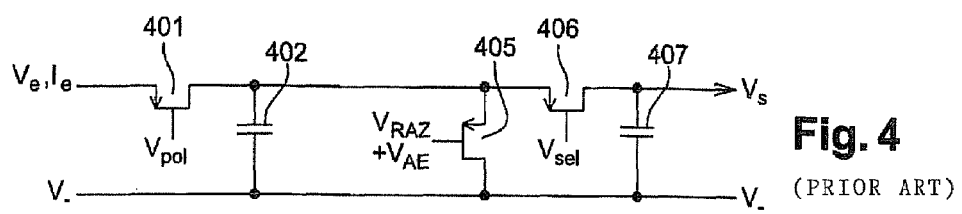
Figure 5:
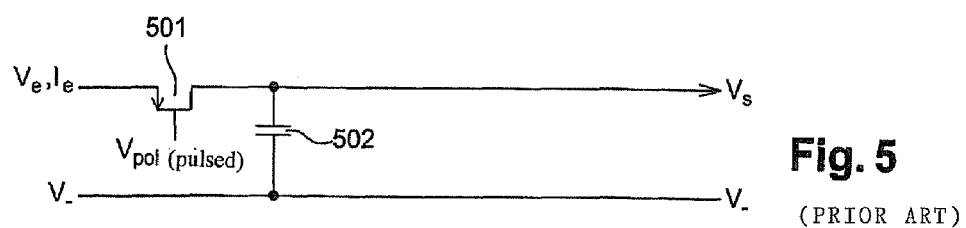
Figure 6:
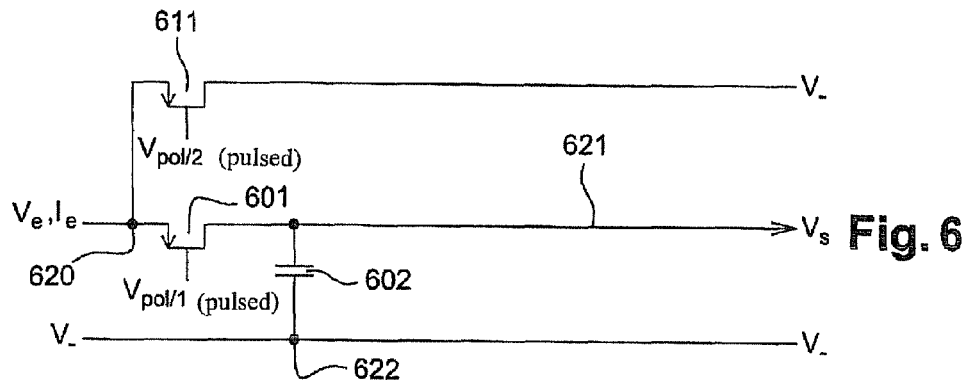
FIG. 6 is a diagrammatic representation of a current reading device in accordance with one inventive embodiment.

FIG. 6 thus shows an input stage in accordance with an embodiment of the present invention.

In this input stage, two p-type MOS transistors 601 and 611 produced using CMOS technology are implanted in order to define a differential pair. The first and second transistors 601 and 611 are therefore mounted on two parallel branches, and have node 620 as a tie point, into which is injected the current for reading $I_e$, which represents the input current coming from a sensor, such as a photodiode.

According to the invention, the source of the first transistor 601 is connected to the input branch intended to inject the current $I_e$ for reading. The drain of the first transistor 601 is itself connected to the output branch, by means of a node 621.

The node 621 is therefore brought to the potential $V_s$, representing the output voltage.

In accordance with the invention, the gate of the first transistor 601 is connected to a polarized impulse voltage source (not shown), capable of delivering voltage pulses in the form of square pulses $V_{pol1}$, $V_{pol2}$. The first transistor 601 is therefore controlled by square pulses of the polarization voltage $V_{pol1}$.

An integrating capacitive element 602 is in addition connected to the output branch by means of the node 621, while its other terminal, shown by the node 622, is brought to a reference voltage $V_-$, in the case in point, that of the mass. The terminal 621 of the capacitive element 602 is therefore brought to the potential $V_s$. Provision might nonetheless be made to implement another reference voltage, in so far as it is at a stable voltage, in other words a potential which is constant for a certain period of time.

The capacitive element 602 is intended to integrate the current for reading $I_e$, in other words to accumulate the moving charges liberated during the interactions between photons and matter which occur in the photosensitive element of each of the elementary sensors making up the matrix photo-detector. More often than not, the moving charges injected into read and exploitation circuits are electrons, which flow to the anode of each elementary sensor, while the holes flow to the cathode.

The capacitive element 602 is therefore sized as a function of the quantity of peak charges it is intended to receive. This sizing depends in particular on the peak value of the dynamic of signals, or currents, coining from the detector and on the integration time. Signal dynamic is taken to mean the amplitude separating the weakest detected signal from the strongest detected signal, the latter generally equating to the value of the analog quantity for integration that saturates the detector. The injected currents $I_e$ are quite obviously representative of this analog quantity.

The source of the second transistor 611 is therefore connected to the common node 620, while its drain is connected to the mass $V_-$. As with the first transistor 601, the second transistor 611 is controlled by the polarized impulse voltage source $V_{pol2}$ applied to the gate thereof.

However, in accordance with the invention, the second transistor 611 is controlled by the pulses which are in phase opposition relative to those controlling the first transistor 601. The second transistor 611 is therefore controlled by the voltage $V_{pol2}$ which is in phase opposition relative to the voltage $V_{pol1}$ controlling the first transistor 601.

Consequently, the second transistor 611 is in the off state, when the first transistor 601 is put into the on state, thereby defining the integration phase. Vice versa, the second transistor 611 is in the on state when the first transistor 601 is in the off state, thereby defining the read phase or storage phase.

Thus, during the integration phase, the injected current $I_e$, coining from each elementary sensor, crosses the first transistor 601 and accumulates its charges on the integrating capacitive element 602. During this phase, no current flows in the second branch comprising the second transistor 611.

During the read, or storage phase, the first transistor 601 is controlled in the off state by the voltage source, while the quantity of moving charges accumulated on the capacitive element 602 is fixed and may be evaluated from the potential of the output branch 621, or by a transfer of these charges to an output amplifier.

It should be noted that, in a known way, each elementary sensor demonstrates electrical behaviour comparable to that of a diode, consequently presenting a certain capacitance (not shown). It is this capacitance which, in prior art input stages, accumulates parasitic charges, which are added to the wanted signal to the detriment of linearity.

In accordance with the invention, during this read phase, the input branch 620, which constitutes the output of each elementary sensor, is kept at a constant potential by means of the second transistor 611 which is itself controlled in the on state. During this phase, the moving charges coining from the sensor are evacuated to the potential $V_-$ of the mass without being counted.

As a result, unlike with prior art input stages, the polarization voltage of the detector remains constant and the capacitance represented by each elementary sensor is unable to accumulate any parasitic charges that may be injected into the input stage and thereby cause a drift during the next integration phase.

The wanted signal is thus not degraded by parasitic charges accumulated on the sensor during phases other than integration. The linearity of a photo-detector provided with a current reading device such as that shown in FIG. 6 is increased relative to the photo-detector fitted with a prior art input stage.

Moreover, this improvement in linearity is obtained with a limited number of electronic components, in the case in point two, such that bulk and power consumption are also reduced relative to those of prior art devices.

The input stage in accordance with the present invention also protects the detector against significant depolarization in the event of blooming. Indeed, when there is blooming, in other words when the transistor 601 is no longer in a position to drain the charges from the detector, the transistor 611 is able to drain these charges after a depolarization equal to the difference between $V_{pol1}$ and $V_{pol2}$.

In addition, the reduced bulk of the inventive input stage means that available space can be liberated for the integrating capacitance, thereby increasing the quantity of charges that can be stored per elementary pixel.

Figure 7:
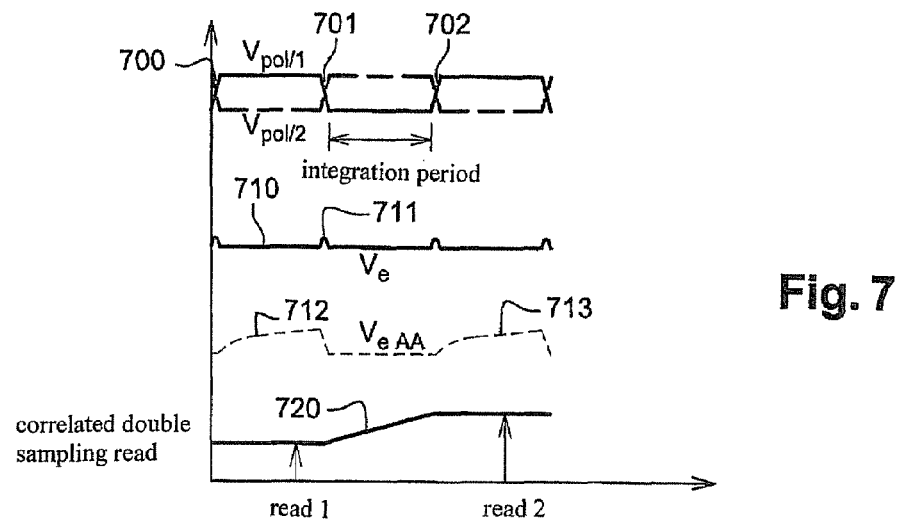
FIG. 7 is a diagrammatic representation of a graphic showing one embodiment of the method constituting the object of the present invention, as well as the operation of the prior art input stages.

FIG. 7 shows a timing diagram that illustrates the operation of the device shown in FIG. 6 according to an inventive method. FIG. 7 therefore shows the changes in the polarized impulse voltages $V_{pol1}$ and $V_{pol2}$, the input voltage $V_e$ measured at the node 620 and the output voltage $V_s$. Moreover, FIG. 7 shows in broken lines the variations in input voltage that could typically be measured on a prior art input stage.

In accordance with one embodiment of the invention, the control voltages $V_{pol1}$ and $V_{pol2}$ are in the faun of square pulses, defining the initial and final instants of the integration 701-702 and read 700-701 phases, also known as the maintenance phase. These square pulses change between two voltage levels, the discrepancy between these levels being sufficient to guarantee that one of the transistors is blocked.

The instants 700 and 702 therefore show both the start of a read phase and the end of an integration phase. Conversely, the instant 701 shows the end of a read phase and the start of an integration phase.

Thus, in the first step in the method constituting the object of the invention, the polarized impulse voltage source (not shown) generates a first square voltage pulse $V_{pol1}$. During this integration phase, the first transistor 601 is then put into the on state in order to supply the capacitive element 602 with the current $I_e$ for reading, while the second transistor 611 is put into the off state.

As is shown in FIG. 7, the integration phase involves an increase in the output voltage shown by the ramp 720. This ramp 720 is mainly dependent on the current $I_e$ from the detector, and on the value of the integrating capacitance.

In a next step in the method constituting the object of the invention, the polarized impulse voltage source (not shown)

generates a second square voltage pulse in phase opposition with the first. The second transistor 611 is then put into the on state in order to keep the input branch at a constant potential, while the first transistor 601 is put into the off state. The charges stored in the capacitive element 602 can then be read across the output branch of the device.

The input voltage $V_e$ is kept relatively stable, during the read phase, except for small deviations related to the electronic switching of controls at the gates 711. On the contrary, the prior art input voltage $V_{eAA}$, as disclosed above, shows significant drifting 712-713 during the read phases due to the accumulation of parasitic charges in the capacitance of the detector, under the effect of variations in the polarization voltage of the elementary sensors.

Figure 8:
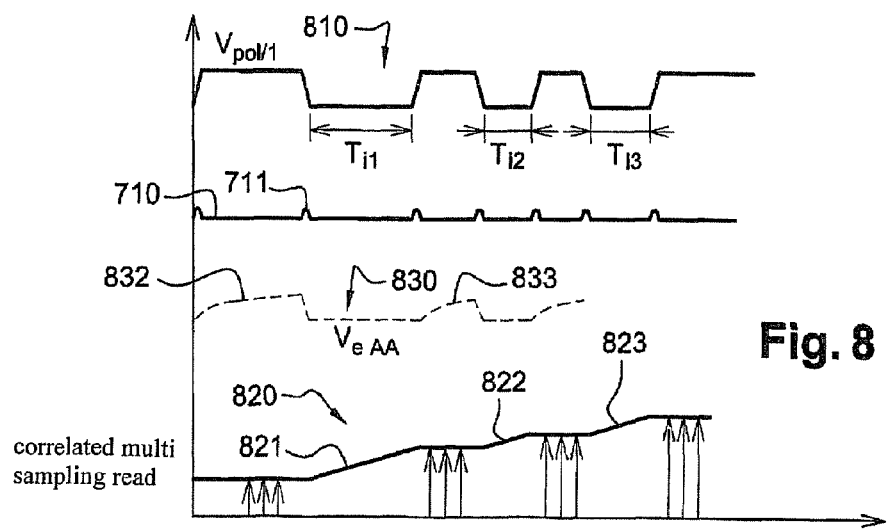
FIG. 8 is a diagrammatic representation of a graphic showing another embodiment of a method constituting the object of the present invention, as well as the operation of a prior art input stage.

FIG. 8 shows a timing diagram that illustrates the so-called "multi-integration" method. In accordance with this method, the integration and read phases concatenating, the output voltage $V_s$ has successive gradients 821-823 interspersed with flat parts during which the reading of stable data is possible. In other words, the sequence of steps shown in FIG. 7 is repeated in order to achieve multiple integrations as is shown in FIG. 8. A plurality of read phases is thus produced, thereby multiplying the read data coming from the detector.

In addition, said "multi-integration" method makes it possible to choose the periods during which the charges coming from the detector are integrated.

In FIG. 8, the curve 830 shows the drifts 832-833 in the input voltage $V_{eAA}$ of a prior art input stage, drifts that can be cancelled by a reset before the next integration, using a reset transistor, such as the transistor 305. In fact, a reset of this kind prevents said charges from accumulating during a plurality of successive integration phases. It is therefore incompatible with the implementation of a multi-integration method.

In addition, said "multi-integration" method can be used to measure the detector current over a fraction of the total integration time. This therefore means that the strongest currents can be read thereby increasing the dynamic of the device. The signal-to-noise ratio is therefore improved.

The inventive input stage shown in FIGS. 6, 7 and 8 also allows reading of the "correlated double sampling" type or of the "correlated multi-sampling" type.

In the first type, reading the signal value at the start and at the end of integration means that the noise generated by the reset phase can be eliminated, with the signal obtained being extracted from the difference in the read values.

In the second type, the first type is generalized for a number of readings greater than two. The wanted signal is obtained by statistically processing the read values which means that the noise generated by the reset phase, as well as some of the read noise, can be eliminated.

Consequently, a current reading device in accordance with the present invention avoids the drawbacks afforded by prior art input stages. It offers a relatively stable potential difference at the terminals of the elementary sensor; it reduces the injection of parasitic charges into the integration circuit; it is actually relatively small in bulk; it does not consume much energy; it is not therefore prone to overheating; it is fairly insensitive to blooming.

Thus, an electromagnetic radiation detector, such as a photo-detecting diode, provided with an input stage offering all these advantages, has greater linearity and a higher signal-to-noise ratio.

The invention claimed is:

1. A device for reading electric currents received on an input branch coming from elementary sensors of a matrix device for detecting electromagnetic radiation, comprising a capacitive element that integrates the currents, the terminals of said capacitive element being connected to a mass and to an output branch of said device respectively, wherein said device further comprises a differential pair consisting of:
   a first transistor mounted between the input branch and the capacitive element, said first transistor being controlled by a polarized impulse voltage capable of putting said first transistor alternately into the off state and then into the on state, wherein when said first transistor is in the on state, said first transistor sets the potential of the input branch to a constant value and supplies the capacitive element with the currents for reading;
   a second transistor mounted between the input branch and a potential other than that of the capacitive element, said second transistor also being controlled by a polarized impulse voltage capable of putting said second transistor alternately into the off state and then into the on state, wherein when said second transistor is in the on state, said second transistor keeps the input branch at a constant potential in time other than that of the capacitive element and drains the charges received on the input branch elsewhere than into the capacitive element, wherein said second transistor is controlled in phase opposition relative to the first transistor, the second transistor being in the on state every time the first transistor is in the off state, and the second transistor being in the off state every time the first transistor is in the on state.

2. The device for reading electric currents as claimed in claim 1, wherein said transistors are CMOS, or bipolar, transistors, the transistors being n-type or p-type.

3. The device for reading electric currents as claimed in claim 1, wherein said input branch is connected to an elementary sensor forming part of an assembly of elementary sensors arranged in a line or in a matrix.

4. A method for reading electric currents, such as those coming from elementary sensors of a matrix device for detecting electromagnetic radiation, wherein it implements the device as claimed in claim 1, that further sequentially comprises the following steps:
   generating a first voltage pulse ($V_{pol1}$), in the form of a square pulse, using a polarized impulse voltage source ($V_{pol1}$, $V_{pol2}$);
   putting the first transistor into the on state in order to inject a current for reading capable of charging the capacitive element, while the second transistor is put into the off state;
   generating a second pulse ($V_{pol2}$) in phase opposition with said first pulse ($V_{pol1}$), in the form of a square pulse, using the polarized impulse voltage source ($V_{pol1}$, $V_{pol2}$);
   putting the second transistor into the on state in order to keep the input branch at a constant potential, while the first transistor is put into the off state, the capacitive element then being read across the output branch sequentially.

5. The method for reading electric currents as claimed in claim 4, wherein it comprises repeating said step sequence in order to obtain a plurality of phases of integrating current into the capacitive element, the phases during which the first transistor is put into the off state and the second transistor is put into the on state allowing the evacuation of the charges received on the input branch by the second transistor in order to read the total amount of the integrated charges as well as the intermediate charge build-ups.

6. A method for reading electric currents as claimed in claim 4, wherein the amplitudes of the first and second pulses are selected in such a way that a transistor put into the off state is on the verge of triggering the on state.

* * * * *